Patented Dec. 5, 1944

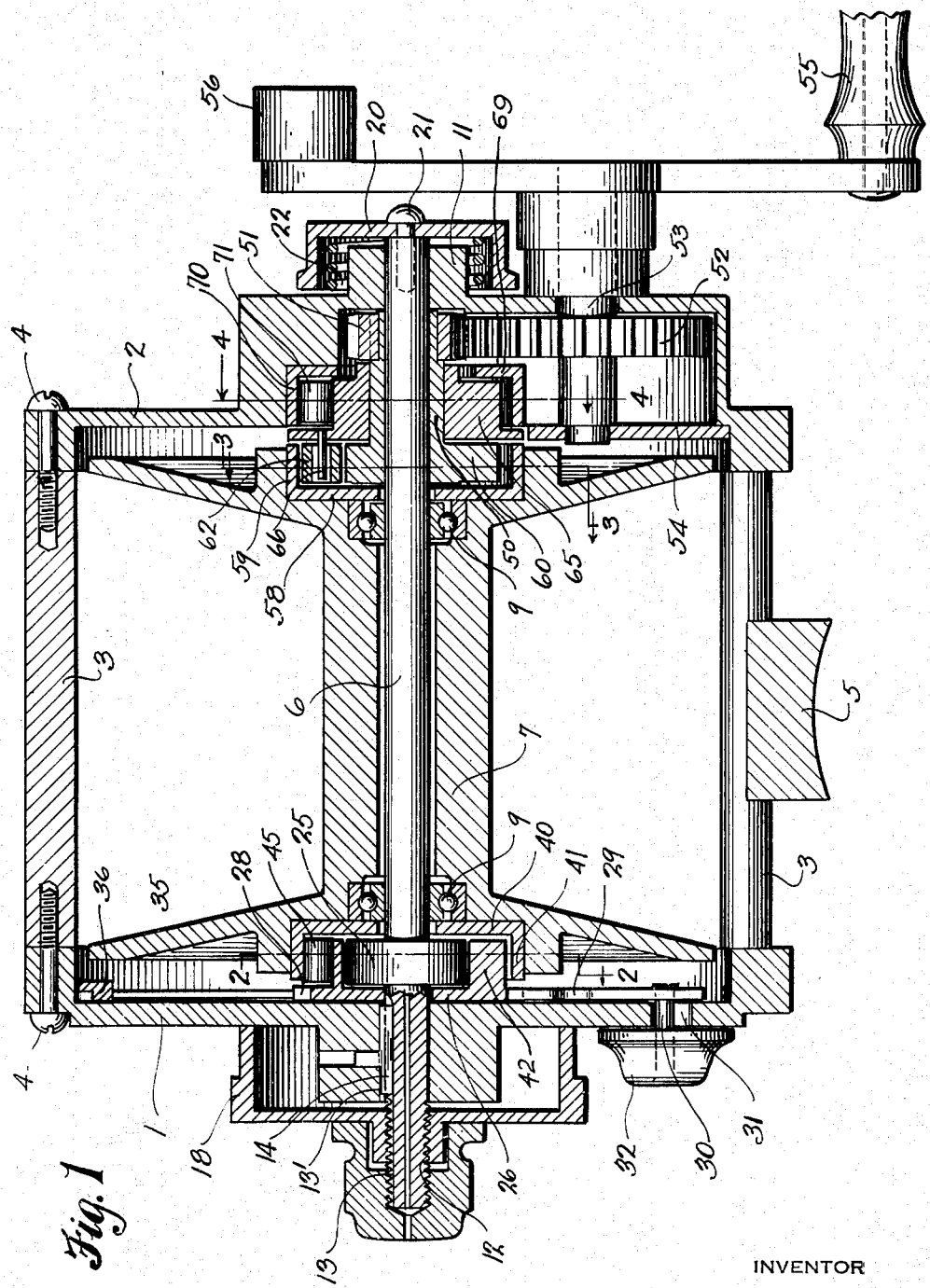

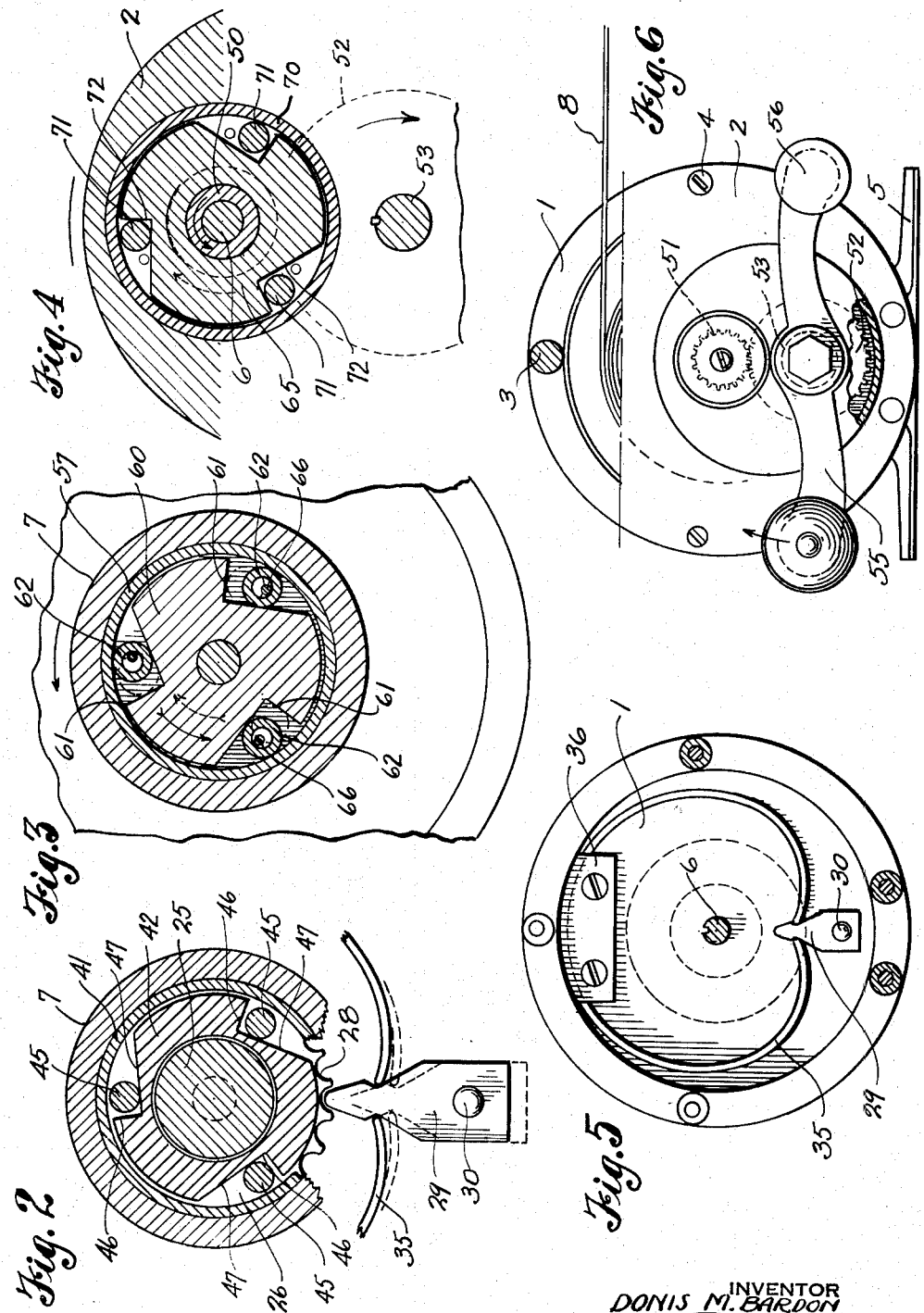

2,364,047

UNITED STATES PATENT OFFICE 2,364,047

LINE REELING DEVICE

Donis M. Bardon, Seattle, Wash.

Application October 30, 1942, Serial No. 463,863

5 Claims. (Cl. 242—84.5)

This invention relates to line or cable winding reels and it has reference more particularly to reels for fishing lines, such as those used in fishing for salmon and the like, and which provide that the line may be manually wound in on the reel to draw in the caught fish, and also wherein it is provided that the line may be reeled out by the run of the fish against an adjusted reel braking tension to avoid breaking the line and to tire the fish.

Preparatory to reciting the objects and advantages of the present invention, it will be here explained that there are many kinds and types of fishing line reels now on the market but in all instances to my knowledge, where an adjustable brake mechanism is used for retaining the reel against free unwinding, it is required, either that the manual winding in of the line be against this tension or that some form of trip or release device be manually actuated so that the tension will be released and the reel run free. In the first instance, it is annoying, tiring and impractical to wind in a line against the tension of a brake. In the second instance, it is not always convenient and is annoying to be continually giving attention to the releasing or applying of the brake clutch, and especially is this true if the release must be actuated by the winding hand while the rod has to be held by the other.

In view of the foregoing mentioned objections and in view of other conditions of use, it has been the main object of this invention to provide an improved type of fishing line reeling mechanism or device wherein provision is made for applying a desired braking tension on the reel to resist unwinding and paying out of the line therefrom under the run of a fish, and to provide novel clutch devices through which the manual application of power for winding in the line on the reel will automatically release the set braking tension on the reel so that it will be permitted to wind freely so long as the line is being drawn in.

Another object is to provide a reel as above stated wherein novel clutch devices are employed to automatically release the geared driving connection between the reel and the winding crank while the line is running out so as to avoid the spinning of the winding crank.

Other objects of the invention reside in the details of construction of parts, in their special combination and relationship and in their mode of operation, as will hereinafter be fully described.

In accomplishing these and other objects of the invention, I have provided the improved details of construction, the preferred forms of which are illustrated in the accompanying drawings wherein—

Fig. 1 is a sectional view of a reel embodying improvements in accordance with the objects of the present invention; the section being taken in the axial plane of the reel.

Fig. 2 is a sectional view of the automatic clutch device which renders the braking and tension mechanism effective upon unwinding of the reel; the section being taken on the line 2—2 in Fig. 1.

Fig. 3 is a sectional detail of the automatic roller clutch mechanism for driving the reel; this section being taken on line 3—3 in Fig. 1.

Fig. 4 is a similar sectional detail on line 4—4 in Fig. 1, showing the automatic clutch for effecting release of the reel driving clutch, thus to allow the reel to unwind freely without causing rotation of the turning crank.

Fig. 5 is an inside view of one of the frame end plates, showing the mounting thereon of the ratchet pawl.

Fig. 6 is an end view of the reel mechanism, with parts broken away for better illustration and showing the reel driving gearing.

Referring more in detail to the drawings—

The present reel comprises a frame structure or housing, including parallel opposite end plates 1 and 2, and plate connecting cross rods 3. As will be understood best by reference to Figs. 1 and 6, the end plates 1 and 2 are circular, and of the same diameter, and are joined rigidly together in such spaced relationship as to provide for mounting a line reel between them, by the rods 3 which are secured at their opposite ends to the plates by screws 4. It is shown in Figs. 1 and 6 that the connecting rods 3 are spaced about the circumference of the plates and two of these rods mount a base bar 5 whereby attachment of the frame of the reeling mechanism may be made to a rod, fitting or support by means and in a manner that is quite well understood in this art.

Disposed coaxially of the frame or housing formed by the end plates 1 and 2 and rods 3, and extended through the end plates, is a shaft 6 upon which a line winding reel 7 mounting a line or cable 8, is revolubly supported; the reel hub being equipped with suitable anti-friction bearings as indicated at 9, on which it revolves. The shaft 6 has its opposite end portions slidably contained in substantial bearings portions 10 and 11 formed as a part of the end plates 1 and 2 respectively. One end of the shaft 6 is threaded, as at 12, and has a longitudinal key slot 13 therein and the bearing 10 is likewise provided with a key slot 13′ in which a key 14 is fitted to hold the shaft against rotation, but without preventing a desired endwise adjustment thereof that is required for applying braking tension to the reel as will presently be explained.

The threaded end portion 12 of the shaft 6 extends somewhat beyond its mounting bearing 10, and has a cylindrical nut 18 threaded thereonto; the inner end of the cylindrical wall of the nut being engaged with the outer surface of the adjacent end plate 1 so that on tightening the nut, the shaft 6 will be pulled toward that end. At its opposite end, the shaft 6 extends through and beyond the end plate bearing 11 and has a cap 20 fixed thereto by a screw 21, and a coiled spring 22 is located beneath the cap and presses outwardly thereagainst and against the adjacent face of the end plate, yieldingly urging the shaft 6 in that direction to insure the release of any braking tension when nut 18 is loosened.

Fixed solidly on the shaft 6 between one end flange of the line reel 7 and the frame end plate 1, is a collar 25 having a flat outer face adapted to be drawn against the inner surface of a flat, circular disk 26 that is disposed between the collar and end plate. This disk is revoluble and has a central opening through which the shaft 6 extends. About its periphery, the disk has a succession of ratchet notches 28, as seen in Fig. 2, with which the end of a pawl 29 engages. The pawl is flat, and is mounted on the inner face of the end plate by a pivot stud 30, and this stud is slidably contained in a radially directed plate slot 31, and on its outer end is equipped with thumb nut 32, as seen in Fig. 2, whereby the pawl may be shifted inwardly or outwardly to engage or disengage its inner end from the ratchet notches. As seen in Figs. 2 and 5, a spring wire loop 35, held within the end plate 1 by a block 36, has its opposite ends engaged with notches in opposite sides of the swinging end of the pawl to yieldingly resist its pivotal action, yet permitting such action when the disk is rotatably driven by the unwinding action of the reel through the mediacy of an automatic clutch mechanism, as will presently be explained.

It will here be noted that the opposite faces of disk 26 respectively engage flatly and frictionally against the inner face of the end plate 1 and outer face of collar 25 and therefore, when the nut 18 is tightened against the outer face of end plate 1, it pulls shaft 6 outwardly and the disk 26 is thus frictionally gripped between the wall 1 and collar 25 thus to apply a braking tension against turning of the disk, and this pressure or tension is transmitted to the reel to resist its unwinding. The holding connection between the disk 26 and reel is by reason of an automatic roller clutch of a type now quite well known in the art, but which for better understanding of the present device, will now be described.

Fixed solidly within that end wall of the reel 7 that faces the end plate 1, and coaxially thereof about the shaft 6, is a clutch plate 40 having a cylindrical wall 41 fitted within the hub of the reel. Contained within this cylindrical wall, is a clutch head 42 that is integral with and is formed on the inner face of disk 26. Interposed between the cylindrical wall 41 and head 42 are the clutch rollers 45. As seen in Fig. 2, the head 42 is formed with three equally spaced peripheral notches 46 containing the rollers 45 and the notches have inclined base surfaces 47 upon which the rollers will roll to and from clutching contact between the wall 41 and surfaces 47 in the unwinding of the reel, to rotate the disk against the applied holding friction; it being understood that when the reel is driven and is winding in the line, the clutch rollers 45 run free and the disk 26 remains stationary with all braking tension removed from the reel.

The winding in of the reel is effected by means as follows:

Revolubly fitted on the shaft 6 between the end plate 2 and adjacent end flange or wall of the reel, is a sleeve 50. On the outer end of this sleeve there is keyed a driving pinion gear 51 with which a larger gear wheel 52 is in driving mesh. Gear 52 is fixed on a shaft 53 that is revolubly supported by passing through bearing openings in the end plate 2, and a supporting plate 54 within the plate. On the outer end of the shaft 53 is a hand turning crank 55, and this, as here shown, has a counter-balance 56.

Fixed coaxially of the shaft 6 within the hub portion of that end flange of the reel that is adjacent the sleeve 50, is a clutch plate 58 having a cylindrical wall 59 surrounding a roller clutch head 60 that is formed integral with the sleeve, and this head, as seen in Fig. 3, is formed with equally spaced peripheral notches 61 in which clutch rollers 62 are contained; these rollers, as noted in Fig. 3, being cylindrical. It is to be understood that this automatic roller clutch takes effect automatically to drive the reel for winding the line thereon whenever the sleeve 50 is positively driven through the geared connection with the hand crank as turned in a winding direction.

By reference to Figs. 1 and 4, it will be understood that there is another roller clutch head 65 fitted to the sleeve 50 between the gear 51 and head 60, to revolve freely thereon. Extending inwardly from this head, in a direction parallel with shaft 6, are pins 66 projecting into the cylindrical rollers 62 with clearance as seen in Fig. 3. Therefore, with the turning of the reel in its line winding direction, the clutch head 65 will be caused to turn in a like direction by reason of the connection provided by the pins 66. This clutch head is a part of the automatic roller clutch that is employed to insure a release of the reel driving clutch when the line is being paid out. This clutch is further described as follows:

Set within the end plate 2, encircling the clutch head 65, is a plate 69 having a cylindrical wall 70, and interposed between the clutch head 65 and wall 70 are clutch rollers 71, contained in notches 72 of the head; it being understood that this clutch is an automatic roller clutch operating like those already described, but is arranged to act in an opposite direction from the adjacent, reel driving clutch, as will be apparent upon inspection of Figs. 3 and 4.

Assuming that the reeling device is so constructed, and that the various parts have been assembled as described and illustrated, and that the reel is properly mounted, and a fish line or the like, designated at 8 in Fig. 6, has been applied to the reel, the operation of the reeling mechanism would be as follows:

First, with the nut 18 loosened sufficiently to release any braking tension on the reel, the line 8 is paid out to the extent desired. During this paying out of line, the pawl 29, if desired, may be adjusted inwardly to engage the ratchet teeth 28 of disk 26, and will prevent free spinning of the reel, by reason of the fact that the associated clutch, seen in Fig. 2, causes the disk to rotate with the reel when it is turning in an unwinding direction. Then with the line paid out, the nut 18 is tightened to draw the collar 25 against disk 26 to set the brake, which provides the desired line tension as may be determined by test pulls on the line.

Assuming that a fish has been caught on the line and has reached the end of a run, the fisherman then starts winding in the line by turning the hand crank 55 in the direction of the arrow show thereon in Fig. 6. This operates through the gearing shown to rotate the sleeve 50 and the clutch head 60 in the direction indicated by the solid line arrow shown on the head in Fig. 3, and through the mediacy of the clutch rollers 62 and wall 57, drives the reel in a direction whereby to wind in the line thereon.

In view of the connection provided between the rollers 62 and the clutch head 65 effected by the pins 66 extended from the head as seen in Figs. 1 and 3, it will be understood that when the clutch rollers 62 take driving effect on the reel 7 as in Fig. 3, the clutch head 65 then will be caused to rotate counter-clockwise and in unison with the reel, and this will cause an automatic release of the rollers 71 from their holding contact with the end plate 2, and this clutch then becomes ineffective. Unwinding motion of spool 7 will carry roller 62 and clutch member 60 with it until roller 62 contacts pin 66 and drives member 65 (Fig. 4) clockwise far enough to engage the clutch of Fig. 4. When this clutch is engaged, pin 66 will be stopped and will stop movement of roller 62. Continued movement of member 60 will then cause the roller 62 to assume its disengaged position against face 61 and spool 7 will turn without further driving member 60 and crank 55.

During this, or any run of the fish, the clutch rollers 45 take hold and thus cause the disk 26 to rotate with the reel, and the braking tension to be applied to tire the fish. This tension may be adjusted to the extent desired merely by turning the nut 18 to apply more or less pressure by the collar 25 against the disk 26.

The particular advantages in this reel are:

First, the desired braking tension as set prior to a run of the fish, may be easily and quickly readjusted merely by turning the nut 18 which is readily accessible.

Second, winding in of the reel by means of the crank 55 automatically releases the braking tension which will again become effective upon release of the crank and turning of the reel in a reverse direction under run of the fish.

Third, releasing action of the driving clutch by the run of the fish automatically renders the driving connection between the reel and crank ineffective so that the crank will not be caused to turn or spin with the unreeling of the line.

Fourth, all clutching and braking actions are fully automatic.

Fifth, no ratcheting action is produced in the winding in of the line.

Having thus described my invention, what I claim as new therein and desire to secure by Letters Patent is:

1. A line reeling device comprising a frame, a reel mounting shaft held against rotation in the frame, a reel revoluble on the shaft, for the winding in or paying out of a line therefrom, a brake disk revoluble on the shaft and frictionally engageable with the frame to produce a braking tension, means for adjusting the braking tension as provided by the disk, an automatic clutch interposed between the reel and brake disk and operable to cause the disk to rotate with the reel on turning of the reel in one direction by the drawing out of a line therefrom and permitting the reel to run free of braking tension when turning in the other direction for winding a line thereonto, and winding gearing for the reel including a sleeve revoluble on the shaft, and an automatic clutch between the sleeve and reel rendered effective by driving the sleeve in line winding direction and which is automatically releasable on removal of the turning force and rotation of the reel by the pull on the line extending therefrom.

2. In a line reeling device, a frame, a shaft mounted therein for limited endwise shifting, a reel mounted to revolve about the shaft for the winding in or paying out of a line therefrom, a collar fixed on the shaft, a braking disk mounted revolubly on the shaft between the said collar and a member of the frame in frictional contact therewith, a nut on the shaft engaging the frame member and adjustable to cause movement of the shaft whereby the disk will be frictionally gripped between the collar and frame, an automatic clutch interposed between the disk and reel rendered effective to turn the disk with the reel only with the unwinding of the reel by the drawing out of a line therefrom, and winding gearing for driving the reel in line winding direction.

3. In a line reeling device, a frame including an end member, a reel supporting shaft mounted in the frame and extended through said member for limited endwise adjustment, a line winding reel revoluble on the shaft, a collar fixed on the shaft, a friction disk revoluble on the shaft and disposed between the said collar and said end member, a nut threaded onto the shaft engaging the frame and adjustable to move the shaft to cause the disk to be frictionally gripped between the collar and said end member to produce a braking tension for the reel, an automatic clutch interposed between the reel and said disk to cause the disk to turn against the set braking tension on rotation of the reel by the drawing out of a line therefrom, and winding gearing for the reel including a sleeve revoluble on the shaft, driving means for rotating the sleeve and an automatic clutch interposed between the sleeve and reel and effective only on turning the sleeve by the driving means in a direction for winding a line in on the reel.

4. In a line reeling device, a frame, a shaft mounted therein, a line winding reel revoluble on the shaft, a sleeve revoluble on the shaft, a positive means for manually driving the sleeve, a roller clutch interposed between the sleeve and reel which becomes effective to drive the reel for the winding in of a line thereon when the sleeve is driven in one direction, and an oppositely acting clutch for causing release of said roller clutch incident to unwinding of the reel by the drawing out of the line therefrom.

5. In a line reeling device, a mounting frame, a non-rotatable shaft mounted therein, a reel revoluble on the shaft for the winding in or paying out of a line therefrom, a sleeve revoluble on the shaft, a winding crank, gearing operatively connecting the crank and said sleeve, an automatic roller clutch interposed between the sleeve and reel which becomes effective to drive the reel on driving the sleeve by the crank in a winding direction, and a second automatic roller clutch associated with the sleeve and frame and rendered ineffective incident to the first clutch being rendered effective and moving with the reel, and rendered effective automatically to retain the first clutch disengaged while a line is being drawn out from the reel, thus to prevent reverse driving of the crank through this clutch connection.

DONIS M. BARDON.